May 13, 1930.  E. T. JANSSON  1,758,443

MILKING MACHINE

Filed Aug. 24, 1928

INVENTOR

Ernst Tage Jansson

BY

Busser and Harding

ATTORNEYS.

WITNESS:

Patented May 13, 1930

1,758,443

UNITED STATES PATENT OFFICE

ERNST TAGE JANSSON, OF STOCKHOLM, SWEDEN, ASSIGNOR TO THE DE LAVAL SEPARATOR COMPANY, OF NEW YORK, N. Y., A CORPORATION OF NEW JERSEY

MILKING MACHINE

Application filed August 24, 1928, Serial No. 301,885, and in Sweden October 20, 1927.

In milking machines operated by vacuum and comprising a milk receiving pail interposed between the vacuum pipe line and the teat cups, the milk is liable, occasionally and at irregular intervals, to bacterial infection. In ordinary operation, the milk suffers no contamination, but occasionally, without apparent cause, the milk develops an abnormally high content of bacteria.

Careful investigations disclose that the source of contamination is the small amount of liquid that occasionally enters the milk pail from the fixed vacuum pipe line. In any milking machine system, bacteria-carrying vapor may enter with the air and condense into a liquid, and if a small amount of such liquid enters the milk, the latter affords a vehicle for the development of a powerful bacterial growth. In vacuum operated milking machines, the entry of such vapor may not cause any contamination of the milk, because the normal flow of air is from the milk pail to the vacuum pump, which tends not only to prevent a flow of any liquid in the reverse direction but also to withdraw from the system any condensate that may form therein. If, however, from any cause, the air current is temporarily weakened, or if it is altogether arrested, as it is when the operation of the machine is stopped, a very small quantity of liquid may enter the milk pail.

The likelihood of this source of contamination is diminished by so arranging the detachable hose connection from the fixed vacuum pipe to the milk pail that the opening from the pipe line through the usual plug valve cock to the hose shall be at a substantial distance above the lowest part of the pipe, thereby tending to prevent the flow of condensate into the hose and thence into the pail. To avoid a sharp bending of the hose the connecting cock has been given an angular shape.

This expedient reduces the danger of milk infection, but it does not guard against it reliably under all circumstances. In some constructions the insecurity of this expedient is due to the fact that the cocks are so constructed that the interior of the plug valve connects with the vacuum pipe line when the cock is shut off, so that any bacteria-containing vapor present in the pipe line therefore condenses in the hollow of the plug valve, and when the hose from the milk pail is connected with the cock and the valve is opened, the condensate penetrates into the hose connection and thence finds its way into the pail. In other constructions, wherein the plug valve is not connected with the vacuum pipe line when the cock is shut off, condensate forming in the air passage or in one bend thereof, between the valve and the vacuum pipe, tends to flow by gravity toward the valve, and any condensate that forms in the passage of the valve itself, when the valve is closed, tends, when the valve is opened, to flow by gravity toward the milk receiver. The condensate may thus penetrate into the hose connection and find its way into the pail.

The present invention comprises a construction involving the use of an angularly bent cock, positioned on the fixed vacuum pipe line as above described, but so combined with a valve, such as a plug valve or disc valve, that there is no serious risk that any condensate that forms in the cock or plug while the connection to the milk pail is shut off will enter the hose connection to the pail when the latter is again operatively connected with the vacuum pipe line.

The drawings show three of many different possible embodiments of the invention.

From the teat cups $a$ extends a milk pipe $b$ to a milk pail $c$. In certain types of machines, the teat cups are provided with pulsation chambers and means, well known in the art, are provided to connect the same alternately with vacuum and atmospheric air. Since my invention is applicable to any type of vacuum operated milking machine, only the chief elements of such a machine are shown.

The fixed main vacuum pipe e, which extends from a vacuum pump through the barn, is equipped with cocks, to each of which is connectible one end of a hose d, whose other end is connectible with the milk pail.

Figure 1:
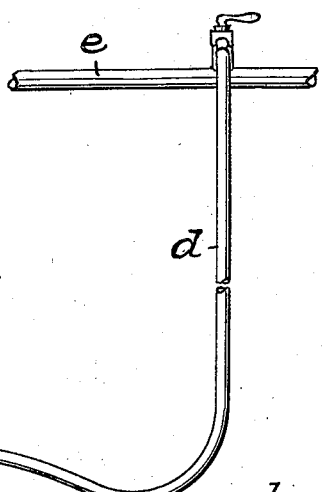
Fig. 1 is a simplified diagram of that part of a milking machine comprising the main vacuum pipe line, one of the teat cups, the milk pail and connections.
Figure 3:
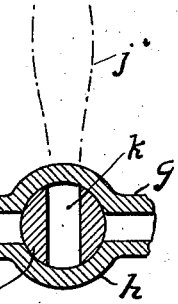
Fig. 3 is a cross-section through the valve of Fig. 2 with the valve turned off.
Figure 2:
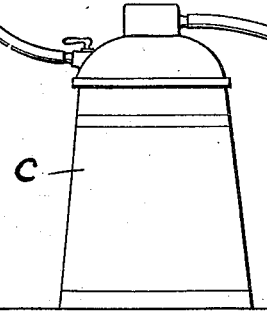
Fig. 2 is a cross-section through the vacuum pipe line, an angular cock and a plug valve, embodying one form of my invention.

In Fig. 2, one branch f of an angular cock extends from pipe e upwardly and diagonally to a valve housing h from which extends downward and diagonally the other branch g of the cock, which is adapted to receive the end of the hose d. The housing is adapted to receive a plug valve i, which is provided with a passage k. The plug valve is adapted to be turned, on a vertical axis, by means of the handle j, either into position to cause passage k to connect the passages in branches f and g, or into position to bring passage k wholly out of register with both the cock passages.

When the valve is closed, no vapor can penetrate it and there can be no condensation in the passage k except of the small amount of vapor that may be present there at the moment the valve is closed. While this amount of condensate may be so small as to be harmless in practice, the possibility of its subsequent penetration into branch g is prevented by so inclining the bottom of passage k in the direction of its length that, when the valve is opened, any condensate therein will tend to flow out toward the branch f, such overflow being rendered certain by the outwardly flowing air current that is established at the instant the valve is opened.

Figure 4:
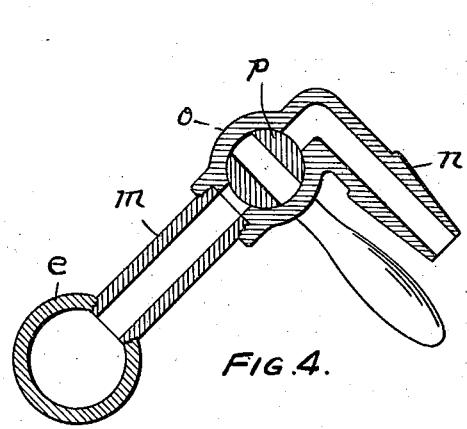
Fig. 4 is a similar view of the same combination somewhat differently arranged.

Another embodiment of the invention is shown in Fig. 4, wherein m and n represent the angular branches of the cock, o the intermediate housing and p the plug valve. In this construction the plug valve is positioned between the vacuum pipe and the angle of the bent passage and turns on a horizontal axis. No special shape need be given the passage in plug valve p, since, when the valve is opened, the direction of inclination of the passage is downward toward the vacuum pipe.

Figure 5:
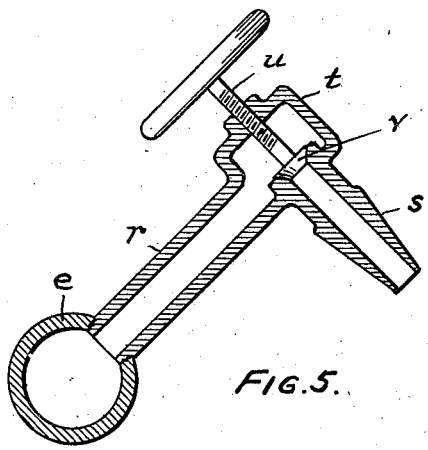
Fig. 5 is a similar view of the same combination, in which a disc valve replaces a plug valve.

Another embodiment of the invention is shown in Fig. 5. The cock, comprising branches r and s and an intermediate housing t, is closable by means of a disc valve v, which is preferably seated on the inner end of the branch s, which projects slightly into the housing, which slopes toward the branch r. The disc may be operated by means of a hand-turnable screw u. When the valve is seated, any liquid that is condensed in the housing tends to flow down toward the vacuum pipe e and cannot possibly escape into the branch s.

By means of any of the above described constructions, or of such modifications thereof as are within the skill of the mechanic, absolute security against contamination of milk by infected condensed liquid is afforded.

What I claim is:

In a milking machine, the combination, with a vacuum pipe and milk receiver, of a cock having a chambered housing above said pipe, a branch extending from the pipe to the housing having a passage extending downward from the housing chamber to the pipe, a second branch having a free end extending from the housing and having a passage therein extending downwardly from the chamber, the bottom of the opening from the last passage to the chamber being above the bottom of the opening from the first passage to the chamber, and a plug in the chamber having a passage therethrough, the bottom of said passage sloping downwardly from the opening to passage in the second branch to the opening in the first mentioned branch, when the valve is open.

In testimony of which invention, I have hereunto set my hand, at Stockholm, Sweden, on this 9th day of August, 1928.

ERNST TAGE JANSSON.